US007587318B2

(12) United States Patent
Seshadri (10) Patent No.: US 7,587,318 B2
(45) Date of Patent: Sep. 8, 2009

(54) CORRELATING VIDEO IMAGES OF LIP MOVEMENTS WITH AUDIO SIGNALS TO IMPROVE SPEECH RECOGNITION

(75) Inventor: Nambi Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 693 days.

(21) Appl. No.: 10/660,780

(22) Filed: Sep. 12, 2003

(65) Prior Publication Data
US 2004/0117191 A1    Jun. 17, 2004

Related U.S. Application Data

(60) Provisional application No. 60/409,956, filed on Sep. 12, 2002, provisional application No. 60/445,816, filed on Feb. 10, 2003.

(51) Int. Cl.
*G10L 15/24* (2006.01)
*G10L 15/20* (2006.01)
*G06K 9/54* (2006.01)

(52) U.S. Cl. ............... 704/231; 704/236; 704/270; 382/116

(58) Field of Classification Search ................ 704/231, 704/236, 246, 247, 251, 252, 270, 271, 273; 382/116
See application file for complete search history.

(56) References Cited

U.S. PATENT DOCUMENTS 4,786,987 A * 11/1988 Fujimura et al. ............ 386/117
4,891,660 A * 1/1990 Biondo, Jr. ................. 396/283
5,271,011 A * 12/1993 McMullan et al. .......... 714/807
5,412,738 A * 5/1995 Brunelli et al. ............. 382/115
5,502,774 A * 3/1996 Bellegarda et al. ......... 382/159
5,761,329 A * 6/1998 Chen et al. ................. 382/116
6,119,083 A * 9/2000 Hollier et al. .............. 704/243
6,219,639 B1 * 4/2001 Bakis et al. ................ 704/246
6,219,640 B1 * 4/2001 Basu et al. ................. 704/246
6,243,683 B1 * 6/2001 Peters ....................... 704/273
6,343,269 B1 * 1/2002 Harada et al. .............. 704/243
6,366,296 B1 * 4/2002 Boreczky et al. ........... 715/719
6,526,395 B1 * 2/2003 Morris ....................... 706/20
6,583,821 B1 * 6/2003 Durand ..................... 348/515
6,633,844 B1 * 10/2003 Verma et al. ............... 704/251
6,675,145 B1 * 1/2004 Yehia et al. ................ 704/270

(Continued)

OTHER PUBLICATIONS

Thambiratnam et al., "Speech Recognition in Adverse Environments using Lip Information", IEEE Region 10 Annual Conference. Speech and Image Technologies for Computing and Telecommunications, TENCON '97, Dec. 4, 1997, vol. 1, pp. 149 to 152.*

(Continued)

*Primary Examiner*—Martin Lerner
(74) *Attorney, Agent, or Firm*—McAndrews, Held & Malloy, Ltd.

(57) ABSTRACT

A speech recognition device can include an audio signal receiver configured to receive audio signals from a speech source, a video signal receiver configured to receive video signals from the speech source, and a processing unit configured to process the audio signals and the video signals. In addition, the speech recognition device can include a conversion unit configured to convert the audio signals and the video signals to recognizable speech, and an implementation unit configured to implement a task based on the recognizable speech.

40 Claims, 5 Drawing Sheets

U.S. PATENT DOCUMENTS

| | | | | |
|---|---|---|---|---|
| 6,816,836 | B2* | 11/2004 | Basu et al. | 704/270 |
| 6,868,383 | B1* | 3/2005 | Bangalore et al. | 704/254 |
| 6,931,351 | B2* | 8/2005 | Verma et al. | 702/182 |
| 6,950,536 | B2* | 9/2005 | Houvener | 382/116 |
| 7,069,215 | B1* | 6/2006 | Bangalore et al. | 704/255 |
| 7,076,429 | B2* | 7/2006 | Basson et al. | 704/272 |
| 7,165,029 | B2* | 1/2007 | Nefian | 704/236 |
| 7,251,603 | B2* | 7/2007 | Connell et al. | 704/270 |
| 7,271,839 | B2* | 9/2007 | Lee et al. | 348/346 |
| 7,343,082 | B2* | 3/2008 | Cote et al. | 386/54 |
| 7,518,631 | B2* | 4/2009 | Hershey et al. | 348/14.1 |
| 2002/0077830 | A1* | 6/2002 | Suomela et al. | 704/275 |
| 2002/0091526 | A1* | 7/2002 | Kiessling et al. | 704/270 |
| 2003/0090590 | A1* | 5/2003 | Yoshizawa et al. | 348/569 |
| 2003/0144844 | A1* | 7/2003 | Colmenarez et al. | 704/273 |
| 2003/0212552 | A1* | 11/2003 | Liang et al. | 704/231 |
| 2004/0109588 | A1* | 6/2004 | Houvener | 382/116 |
| 2004/0234250 | A1* | 11/2004 | Cote et al. | 386/96 |
| 2004/0267536 | A1* | 12/2004 | Hershey et al. | 704/276 |
| 2007/0016426 | A1* | 1/2007 | Hershey et al. | 704/277 |
| 2007/0036370 | A1* | 2/2007 | Granovetter et al. | 381/311 |

OTHER PUBLICATIONS

Teissier et al., "Comparing Models for Audiovisual Fusion in a Noisy-Vowel Recognition Task", IEEE Transactions on Speech and Audio Processing, Nov. 1999, vol. 7, Issue 6, pp. 629 to 642.*

Lucey et al., "Improved Speech Recognition using Adaptive Audio-Visual Fusion via a Stochastic Secondary Classifier", Proceedings of 2001 Symposium on Intelligent Multimedia, Video and Speech Processing, May 2-4, 2001, pp. 551-554.*

"IEEE 802.11, A Technical Overview," Pablo Brenner, BreezeNet website, Jul. 8, 1997, www.sss-mag.com/pdf/80211p.pdf.

Donny Jackson, Telephony, Ultrawideband may Thwart 802.11, Bluetooth Efforts, Primedia Business Magazines & Media Inc., Feb. 11, 2002.

Daniel L. Lough, et al., "A Short Tutorial on Wireless LANs and IEEE 802.11," The IEEE Computer Society's Student Newsletter, Virginia Polytechnic Institute and State University, Summer 1997, vol. 5, No. 2.

Dr. Robert J. Fontana, "A Brief History of UWB Communications," Multispectral.com, Multispectral Solutions, Inc., www.multispectral.com/history.html, Aug. 20, 2002.

Gerald F. Ross, "Early Motivations and History of Ultra Wideband Technology," Anro Engineering, Inc., Multispectral.com, Multispectral Solutions, Inc., www.multispectral.com/history.html, Aug. 20, 2002.

Dr. Terence W. Barrett, "History of UltraWideband (UWB) Radar & Communications: Pioneers and Innovators," Proceedings and Progress in Electromagnetics Symposium 2000 (PIERS2000), Cambridge, MA, Jul. 2000.

Dr. Henning F. Harmuth, "An Early History of Nonsinusoidal Electromagnetic Technologies," Multispectral.com, Multispectral Solutions, Inc., www.multispectral.com/history.html, Aug. 20, 2002.

Rebecca Taylor, "Hello, 802.11b and Bluetooth: Let's Not Be Stupid!", ImpartTech.com, www.ImportTech.com/802.11-bluetooth.htm, Aug. 21, 2002.

Matthew Peretz, "802.11, Bluetooth Will Co-Exist: Study," 802.11-Planet.com, INT Media Group, Inc., Oct. 30, 2001.

"Bluetooth and 802.11: A Tale of Two Technologies," 10Meters.com, www.10meters.com/blue_802.html, Dec. 2, 2000.

Keith Shaw, "Bluetooth and Wi-Fi: Friends or foes?", Network World Mobile Newsletter, Network World, Inc., Jun. 18, 2001.

Joel Conover, "Anatomy of IEEE 802.11b Wireless," NetworkComputing.com, Aug. 7, 2000.

Bob Brewin, "Intel, IBM Push for Public Wireless LAN," Computerworld.com, Computerworld Inc., Jul. 22, 2002.

Ernest Khoo, "A CNET tutorial: What is GPRS?", CNETAsia, CNET Networks, Inc., Feb. 7, 2002.

Les Freed, "Et Tu, Bluetooth?", ExtremeTech.com, Ziff Davis Media Inc., Jun. 25, 2001.

Bluetooth & 802.11b—Part 1, www.wilcoxonwireless.com/whitepapers/bluetoothvs802.doc , Jan. 2002.

Bob Brewin, "Report: IBM, Intel, Cell Companies Eye National Wi-Fi Net," Computerworld.com, Computerworld Inc., Jul. 16, 2002.

Bob Brewin, "Microsoft Plans Foray Into Home WLAN Device Market," Computerworld.com, Computerworld Inc., Jul. 22, 2002.

Bob Brewin, "Vendors Field New Wireless LAN Security Products," Computerworld.com, Computerworld Inc., Jul. 22, 2002.

Jeff Tyson, "How Wireless Networking Works," Howstuffworks.com, Howstuffworks, Inc., www.howstuffworks.com/wireless-network.htm/printable, Aug. 15, 2002.

Curt Franklin, "How Bluetooth Works," Howstuffworks.com, Howstuffworks, Inc., www.howstuffworks.com/bluetooth.htm/printable, Aug. 15, 2002.

802.11b Networking News, News for Aug. 19, 2002 through Aug. 11, 2002, 80211b.weblogger.com/, Aug. 11-19, 2002.

"Wireless Ethernet Networking with 802.11b, An Overview," HomeNetHelp.com, Anomaly, Inc., www.homenethelp.com/80211.b/index.asp, Aug. 20, 2002.

"Simple 802.11b Wireless Ethernet Network with an Access Point," HomeNetHelp.com, Anomaly, Inc., www.homenethelp.com/web/diagram/access-point.asp, Aug. 20, 2002.

"Simple 802.11b Wireless Ethernet Network without an Access Point," HomeNetHelp.com, Anomaly, Inc., www.homenethelp.com/web/diagram/ad-hoc.asp, Aug. 20, 2002.

"Cable/DSL Router with Wired and Wireless Ethernet Built In," HomeNetHelp.com, Anomaly, Inc., www.homenethelp.com/web/diagram/share-router-wireless.asp, Aug. 20, 2002.

"Bridging a Wireless 802.11b Network with a Wired Ethernet Network" HomeNetHelp.com, Anomaly, Inc., www.homenethelp.com/web/diagram/wireless-bridged.asp, Aug. 20, 2002.

"Wireless Access Point (802.11b) of the Router Variety," HomeNetHelp.com, Anomaly, Inc., www.homenethelp.com/web/diagram/share-wireless-ap.asp, Aug. 20, 2002.

Robert Poe, "Super-Max-Extra-Ultra-Wideband!", Business2.com, Oct. 10, 2000.

David G. Leeper, "Wireless Data Blaster," ScientificAmerican.com, Scientific American, Inc., May 4, 2002.

Steven J. Vaughan-Nichols, "Ultrawideband Wants to Rule Wireless Networking," TechUpdate.ZDNet.com, Oct. 30, 2001.

Jim Zyren and Al Petrick, "Brief Tutorial on IEEE 802.11 Wireless LANs," AN9829, Intersil Corporation, Feb. 1999.

"Overview of UWB?", PulseLink.net, Pulse~LINK, Inc., www.pulselink.net/ov_history.html, Sep. 4, 2002.

Robert X. Cringely, "The 100 Mile-Per-Gallon Carburetor—How Ultra Wide Band May (or May Not) Change the World," Interesting-People.org, Jan. 26, 2002.

William A. Kissick, Editor, "The Temporal and Spectral Characteristics of Ultrawideband Signals," NTIA Report 01-383, Jan. 2001, www.its.bldrdoc.gov/pub/ntia-rpt/01-383/.

"Ultra Wide Band," www.ida.gov.sg/Website/IDAContent.nsf/dd1521fle79ecf3bc825682f0045a349/1856626048baf403c82569880267e26%3FOpenDocument+%22Full+duplex+UWB+handheldtransceiver%22&hl=en&ie=UTF-8, Aug. 20, 2002.

* cited by examiner

CORRELATING VIDEO IMAGES OF LIP MOVEMENTS WITH AUDIO SIGNALS TO IMPROVE SPEECH RECOGNITION

CROSS REFERENCE TO RELATED APPLICATIONS

This application claims priority of U.S. Provisional Patent Application Ser. Nos. 60/409,956, filed Sep. 12, 2002, and 60/445,816, filed Feb. 10, 2003, entitled Correlating Video Images of Lip Movements with Audio Signals to Improve Speech Recognition. The contents of the provisional applications are hereby incorporated by reference.

BACKGROUND OF THE INVENTION

1. Field of the Invention

The present invention relates to a method of and an apparatus for using video signals along with audio signals of speech to provide speech recognition, within an environment where speech recognition is necessary. In particular, the present invention relates to a method of and a system for using video images of lip movements with audio input signals to improve speech recognition. The present invention can be implemented in a hand held device, and the invention may include discrete devices or may be implemented on a semiconductor substrate such as a silicon chip.

2. Description of the Related Art

Human speech is made up of numerous different sounds and syllables. Often in many languages, different sounds and/or syllables are combined to form words and/or sentences. The combination of the sounds, syllables, words, and sentences forms the basis for oral communication.

Generally, human speech is recognizable if the speech is clear and comprehensible to another human's ears. On the other hand, human speech can be recognizable by a machine if the audio waves of the speech is received, and the audio waves are recognizable by an algorithm operating within the machine. Although audio speech recognition by machines has advanced in sophistication, the accuracy of audio speech recognition has room for improvements.

SUMMARY OF THE INVENTION

One example of the present invention can be a method of speech recognition. The method can include the steps of receiving audio signals from a speech source, receiving video signals from the speech source, and processing the audio signals and the video signals. The method can also include the steps of converting the audio signals and the video signals to recognizable information, and implementing a task based on the recognizable information.

In another example, the present invention can relate to a speech recognition device. The device can have an audio signal receiver configured to receive audio signals from a speech source, a video signal receiver configured to receive video signals from the speech source, and a processing unit configured to process the audio signals and the video signals. Moreover, the device can have a conversion unit configured to convert the audio signals and the video signals to recognizable information, and an implementation unit configured to implement a task based on the recognizable information.

Additionally, another example of the present invention can provide a system for speech recognition. The system can include a first receiving means for receiving audio signals from a speech source, a second receiving means for receiving video signals from the speech source, and a processing means for processing the audio signals and the video signals. Furthermore, the system can have a converting means for converting the audio signals and the video signals to recognizable information, and an implementing means for implementing a task based on the recognizable information.

Furthermore, another example of the present invention can be directed to a method of speech recognition. The method can include the steps of receiving audio signals from a speech source, receiving video signals from the speech source, processing the audio signals, and converting the audio signals into recognizable information. Moreover, the method can have the step of processing the video signals when a segment of the audio signals can not be converted into the recognizable information. The video signals can coincide with the segment of the audio signals that cannot be converted into the recognizable information. The method also can have the steps of converting the processed video signals into the recognizable information, and implementing a task based on the recognizable information.

In another example, the present invention can be a speech recognition device. The device can have an audio signal receiver configured to receive audio signals from a speech source, a video signal receiver configured to receive video signals from the speech source, a first processing unit configured to process the audio signals, and a first conversion unit configured to convert the audio signals to recognizable information. The device can also have a second processing unit configured to process the video signals when the audio signals cannot be converted into the recognizable information, wherein the video signals coincide with the segment of the audio signals that cannot be converted into the recognizable information, a second conversion unit configured to convert the video signals processed into the recognizable information, and an implementation unit configured to implement a task based on the recognizable information.

In yet another example, the present invention can be drawn to a system for speech recognition. The system can include a first receiving means for receiving audio signals from a speech source, a second receiving means for receiving video signals from the speech source, a first processing means for processing the audio signals, and a first converting means for converting the audio signals into recognizable information. The system can also have a second processing means for processing the video signals when a segment of the audio signals can not be converted into the recognizable information, wherein the video signals coincide with the segment of the audio signals that cannot be converted into the recognizable information, a second converting means for converting the video signals processed into the recognizable information, and an implementing means for implementing a task based on the recognizable information.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
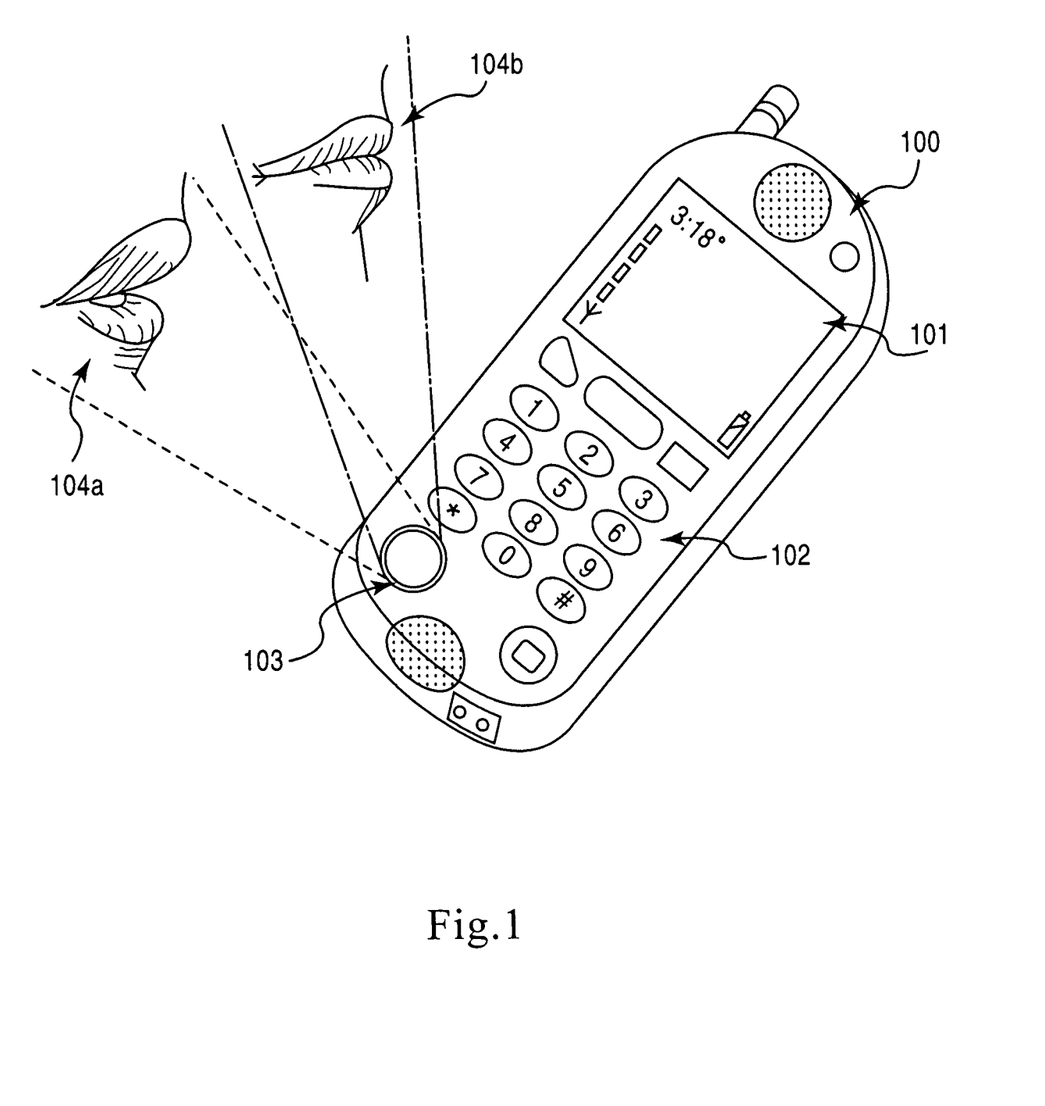
FIG. 1 illustrates one example of a speech recognition device using audio signals and correlating video signals to improve speech recognition, in accordance with the present invention.

FIG. 1 illustrates one example of a speech recognition device for improving speech recognition with audio input signals and correlating video input signals according to the present invention. FIG. 1 shows a mobile phone 100 having a display screen 101 and a plurality of actuators 102. In addition, the mobile phone 100 can include a lens 103 for receiving images in video and/or still picture format. In the example shown in FIG. 1, the lens 103 can capture or receive video images of the movements of a user's lips 104a, 104b made while the user is speaking.

For instance, a user may desire to contact a business associate via an e-mail message. According, the user can access the mobile phone 100 and can activate the speech recognition system of the present invention. The mobile phone 100 is placed adjacent to the user's face where the lens 103 is positioned in proximity to the user's mouth so that the image of the user's lips can be captured by the speech recognition system. Once the lens 103 is positioned correctly, the user can be alerted to commence speaking into the mobile phone 100. The user, for example, can speak and request to send an e-mail message to Jane Doe in which her e-mail address is pre-programmed into the mobile phone 100. In addition, the name James Doe is similarly pre-programmed in the mobile phone 100. The speech recognition system processes the audio signal input and can convert all part of the audio signal input into recognizable information with the exception of the name Jane Doe. The audio speech recognition feature of the invention cannot ascertain if the audio signal is referring to Jane Doe or James Doe.

Accordingly, the speech recognition system of the present invention can access a section of the video input signal corresponding to the audio signal pertaining to Jane Doe. Based on the detected lip movements of the video signals, the present invention can reduce the uncertainty of the audio speech recognition, and therefore can perform speech recognition with the aid of the video signals, and determine that the request is an e-mail message to Jane Doe rather than James Doe. Thereafter, the present invention can implement one or more actions to carry out the spoken request by the user. The one or more actions can be in the forms of commands such as initiating an e-mail application software, creating an outgoing e-mail window, and inserting text, and sending the e-mail message.

Although the example provided in FIG. 1 illustrates a mobile phone 100 having a lens 103, wherein the mobile phone 100 can be configured with the speech recognition system of the present invention, it is noted that the speech recognition system using audio signals and correlating video signals of the invention can be configured on a variety of electronic device, either mobile or stationary. For instance, the improved speech recognition system of the invention can be configured on at least but not limited to a laptop computer, a PDA, an audio/video recording device, a home computer, a game console, a remote controller, or other comparable device.

Figure 2:
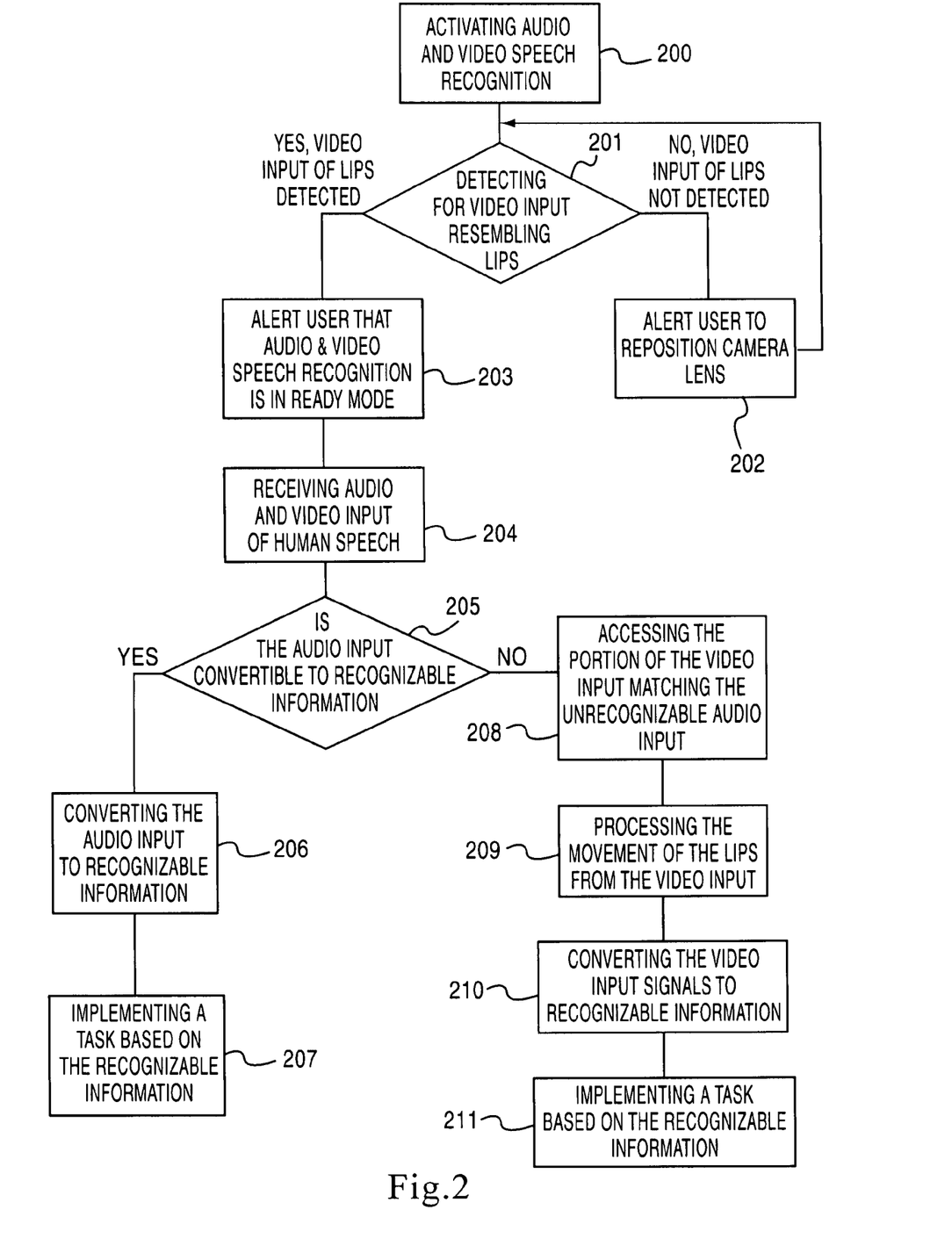
FIG. 2 illustrates a flow chart illustrating one example of a method of speech recognition using audio signals and correlating video signals, in accordance with the present invention.

FIG. 2 illustrates one example of a method of speech recognition using audio input signal and correlating video input signals, in accordance with the present invention. Specifically, FIG. 2 illustrates one example of a method of speech recognition using audio input signals together with correlating video images of lip movements. The method of the present example can be implemented in hardware, or software, or a combination of both hardware and software.

FIG. 2 illustrates one example of a method of speech recognition according to the present invention. A device configured to include a speech recognition system can be activated at step 200 of FIG. 2. In other words, the present invention provides a user with the option to activate the speech recognition feature when necessary. After the speech recognition system is activated, a detecting sensor along with an optical pick-up such as a lens, can detect for video images resembling the user's lips at step 201. If the detecting sensor and the lens do not detect images of the user's lips, then the speech recognition system can alert the user to readjust the lens or the device, or reposition the user's lips so that an image can be detected, at step 202 of FIG. 2. If however, the user's lips can be detected or captured by the lens and the sensor, then the speech recognition system can alert the speaker in step 203 that the speech recognition system is in ready mode, and therefore the user can commence speaking.

Once the user starts to speak, the speech recognition system of the present invention can commence receiving both audio and video input signals from the user's speech and the user's lip movements at step 204. In this example, the speech recognition system can process the audio input signals corresponding to the speech first. In other words, as the user speaks, both the audio speech and the correlating images of the user's lip movements can be received by the speech recognition system of a device. Although both audio and video signals are being received, the speech recognition system can preliminarily initiate only the audio speech recognition portion of the system, and can preliminarily process only the audio portion of the speech.

Therefore, if the speech from the user does not contain a possibly unrecognizable sound or word, then the present invention at step 206 can recognize the speech as comprehensible and recognizable information using only the audio speech recognition portion of the system without the need to activate the assistance of the video signals.

The speech recognition system can process the audio input signals and determine if the audio input signals are recognizable as speech at step 205. If it is determined that the audio input signals corresponding to a user's entire speech can be processed and converted into recognizable information, then the speech recognition system can process the entire audio input signals and convert it to recognizable information at step 206, without initiating the video signal speech recognition functions.

Thereafter, the speech recognition system can implement one or more task(s) based on the recognizable information at step 207. For instance, the speaker can talk into a cell phone configured with the speech recognition system of the present invention. The speaker can request to dial a particular number or connect with the Internet. Therefore, the speech recognition system can convert the speech into either recognizable information such as numeric characters like dialing a particular number, or convert the speech into recognizable information such as a set of code(s) to perform a particular function like connecting with the Internet. Accordingly, the audio signal speech recognition processing functions can become the primary processing functions of the speech recognition system until a section of the audio input signals cannot be processed and converted into recognizable information.

If however a section of the audio input signals cannot be process and converted into recognizable information, the present invention can access the correlating portion of the video input signals at step 208 to assist in recognizing the speech. In other words, whenever the audio speech recognition portion of the system identifies a possibly unrecognizable sound or word, then the speech recognition system can access a portion of the video image of the lip movements of the speaker, wherein the video image can correspond to the unrecognizable audio signal portion. For instance, audio input signals based on a user's speech can be received by the speech recognition system, and when the audio speech recognition portion of the system detects a possible conversion error that is equal to or is above a predetermined threshold level, then the video speech recognition portion of the system can be initiated.

Once the video speech recognition portion of the system is initiated, the system can access the video images of the lip movements correlating to the audio speech in question and can determine the movements of the lips at step 209. The system can thereafter process the video images and assist in the conversion of audio and video input signals to recognizable and comprehensible information at step 210. It is noted that although the video input signals can be processed to assist in speech recognition, the video input signal can also be processed not just as an aid to the audio input signals but as a stand-alone speech recognition feature of the system.

Following the processing and converting of the video input signals correlating to the audio signal in question, the speech recognition system can implement a task based on the recognizable information at step 211.

Thus, the combination of both the audio speech and the video image of the lip movement can resolve unrecognizable audio speech. In addition, the system can be configured to identify likely sounds corresponding to certain lip movements, and can also be configured to recognize speech based on the context in which the word or sound was spoken. In other words, the present invention can resolve unrecognizable speech by referring to the adjacent recognizable words or phrases within the speech in order to aid in the recognition of the unrecognizable portion of the speech.

Figure 3:
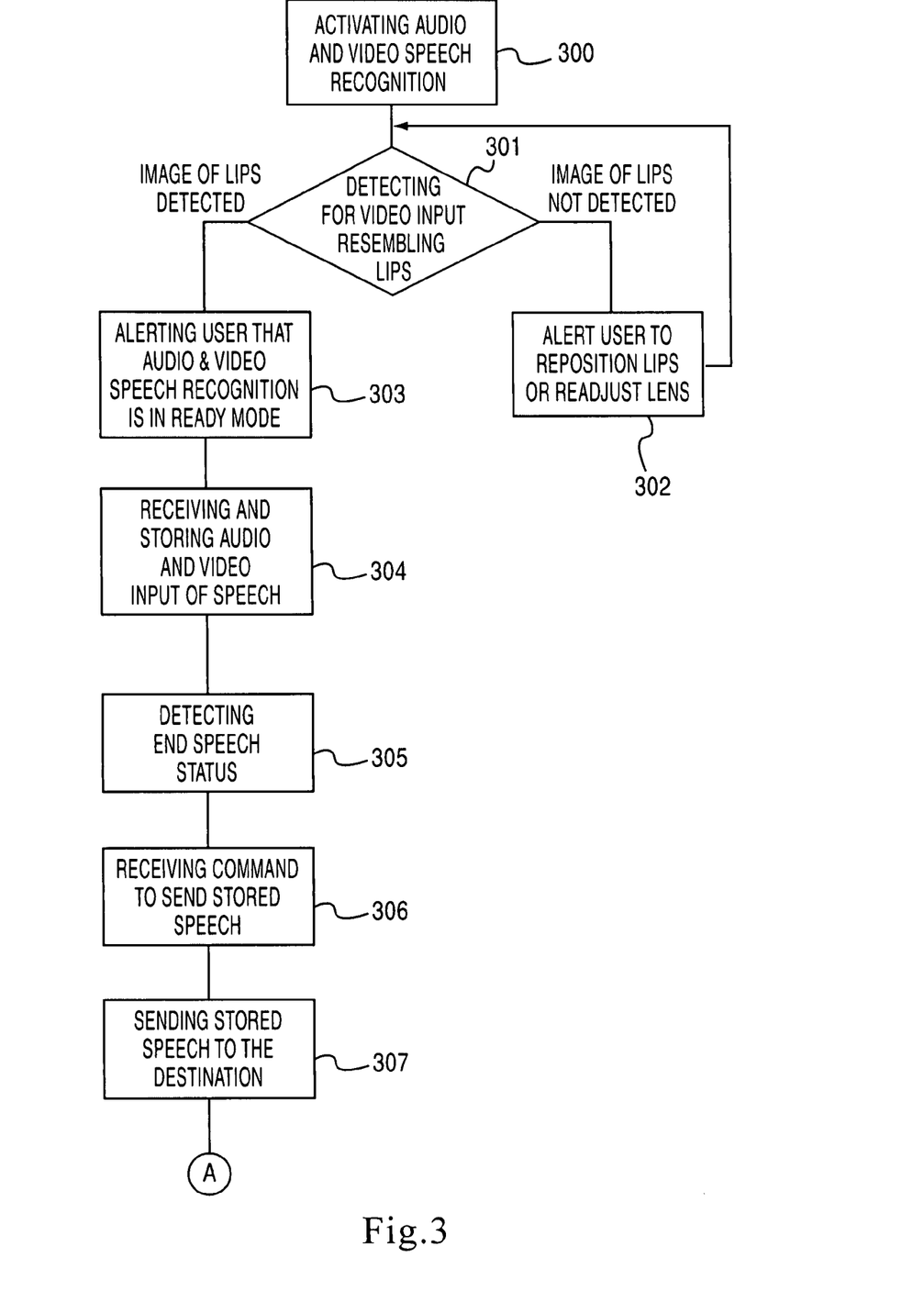
FIG. 3 illustrates a flow chart illustrating another example of a method of speech recognition using audio signals and correlating video signals, in accordance with the present invention.
Figure 4:
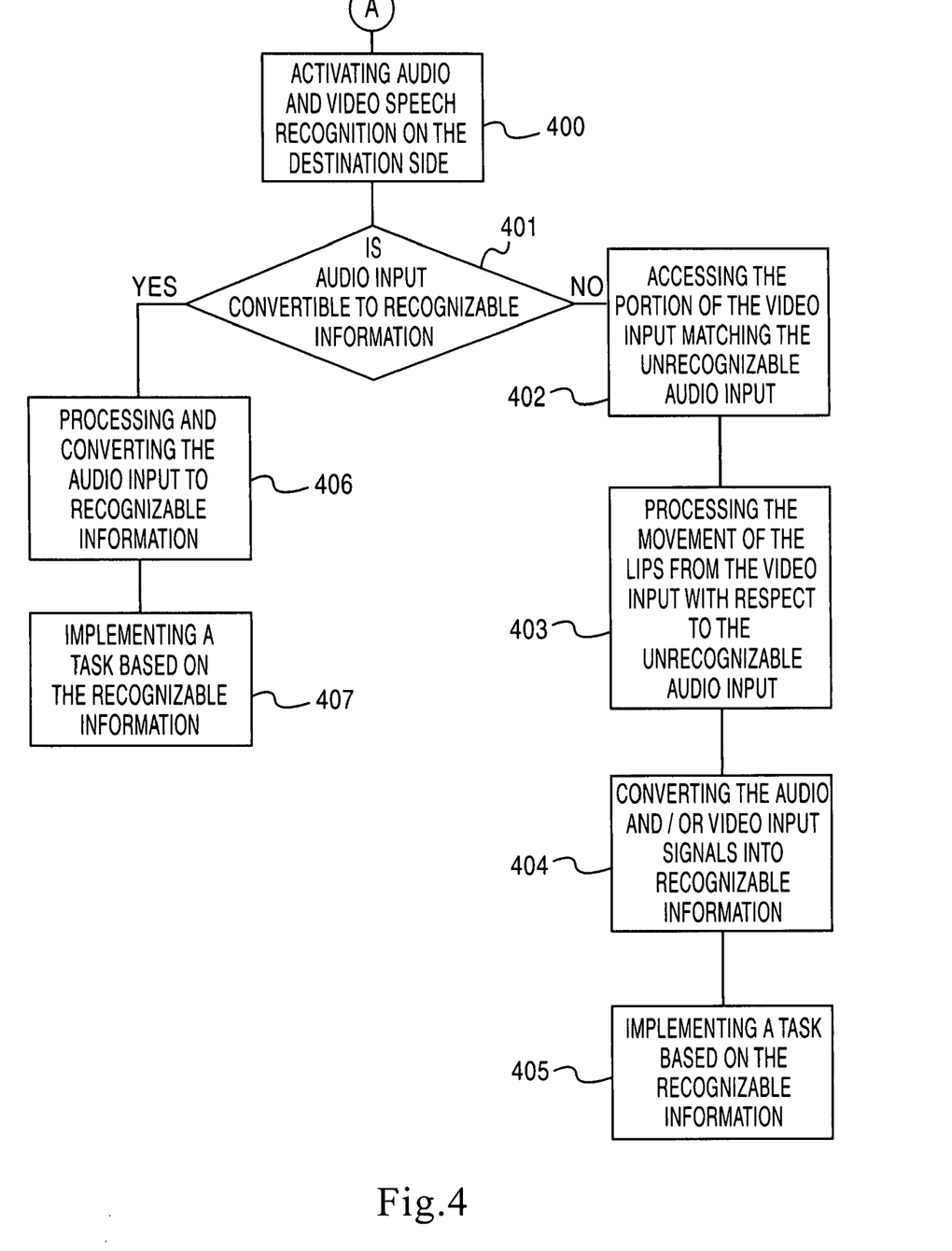
FIG. 4 illustrates a flow chart of a method of speech recognition using audio signals and correlating video signals, in accordance with the present invention.

In an alternative example, the present invention can recognize speech using both audio and video signals at a destination site rather than at the originator. FIGS. 3 and 4 illustrates one example of a method of sending the audio and video input signals to a destination site where the audio and video input signals can be processed and converted into recognizable and comprehensible information. Specifically, FIGS. 3 and 4 illustrate one example of a method of speech recognition at a destination site using audio input signals together with correlating video images of lip movements. The method of the present example can be implemented in hardware, or software, or a combination of both hardware and software.

A device configured to include a speech recognition system can be activated at step 300 of FIG. 3. After the speech recognition system is activated, a detecting sensor along with an optical pick-up such as a lens, can detect for video images resembling the user's lips at step 301. If the detecting sensor and the lens do not detect images of the user's lips, then the speech recognition system can alert the user to readjust the lens or the device, or reposition the user's lips so that an image can be detected, at step 302 of FIG. 3. If however, the user's lips can be detected or captured by the lens and the sensor, then the speech recognition system can alert the speaker in step 303 that the speech recognition system is in ready mode, and therefore the user can commence speaking.

Once the user starts to speak, the speech recognition system of the present invention can commence receiving both audio and video input signals from the user's speech and the user's lip movements at step 304. The received audio input signals and the received video input signals can be stored within a storage unit and/or a plurality of separate storage units.

Following the completion of the user's speech, the speech recognition system can detect, based on sensors and preprogrammed conditions, an end of speech status at step 305. In other word, once the sensors detect that the user has completed his speech and that certain preprogrammed conditions have been met, then speech recognition system can activate an end of speech condition. Thereafter, the speech recognition system can prompt the user if the user desires to send the stored speech at step 306.

If the user responds in the negative, then the stored speech can remain stored in the storage unit(s) and can be recalled at later time. However, if the user responds in the positive, then the speech recognition system can transmit the stored speech to a destination site at step 307.

After the stored speech is received at the destination site, then the destination site can activate the audio and video speech recognition system available at the destination site at step 400. Thereafter, the audio and video speech recognition system can process and convert the audio and video signals to recognizable and comprehensible information as discussed above with respect to FIG. 2. In other words, the speech recognition system at the destination site can preliminarily determine if the audio input signal can be processed and converted to recognizable information at step 401. If the entire audio portion of the speech or the entire audio input signals can be processed and converted as recognizable information, then the system can do so without activating the video speech recognition portion of the system at step 406. Thus, the entire audio portion of the speech can be processed and converted into recognizable information, and the speech recognition system can implement one or more task(s) based on the recognizable information at step 407.

If, however, a section of the audio input signals cannot be process and converted into recognizable information, the present invention can access the correlating portion of the video input signals at step 402 to assist in recognizing the speech. In other words, whenever the audio speech recognition portion of the system detects a possibly unrecognizable sound or word, then the speech recognition system can access a portion of the video image of the lip movements of the speaker, wherein the video image can correspond to the unrecognizable audio signal portion.

Once the video speech recognition portion of the system is triggered, the system can access the video images of the lip movements correlating to the audio speech in question and can process and determine the movements of the lips at step 403. The system can thereafter process the video images and assist in the conversion of audio and video input signals to recognizable and comprehensible information at step 404. After the conversion of the audio and/or video input signals, the speech recognition system can implement one or more task(s) based on the recognizable information at step 405.

It is noted that the speech recognition system of the present invention can simultaneously process and convert the audio input signals and the video input signals in parallel. In other words, rather than the system initiating the audio speech recognition portion of the system to first process and convert the audio portion of the speech, the system can initiate both the audio speech recognition in tandem with the video speech recognition. Therefore, the speech recognition system can process the audio input signals and the correlating video input signals in parallel, and can convert the audio speech and the correlating video images of the lip movements into recognizable and comprehensible information.

Figure 5:
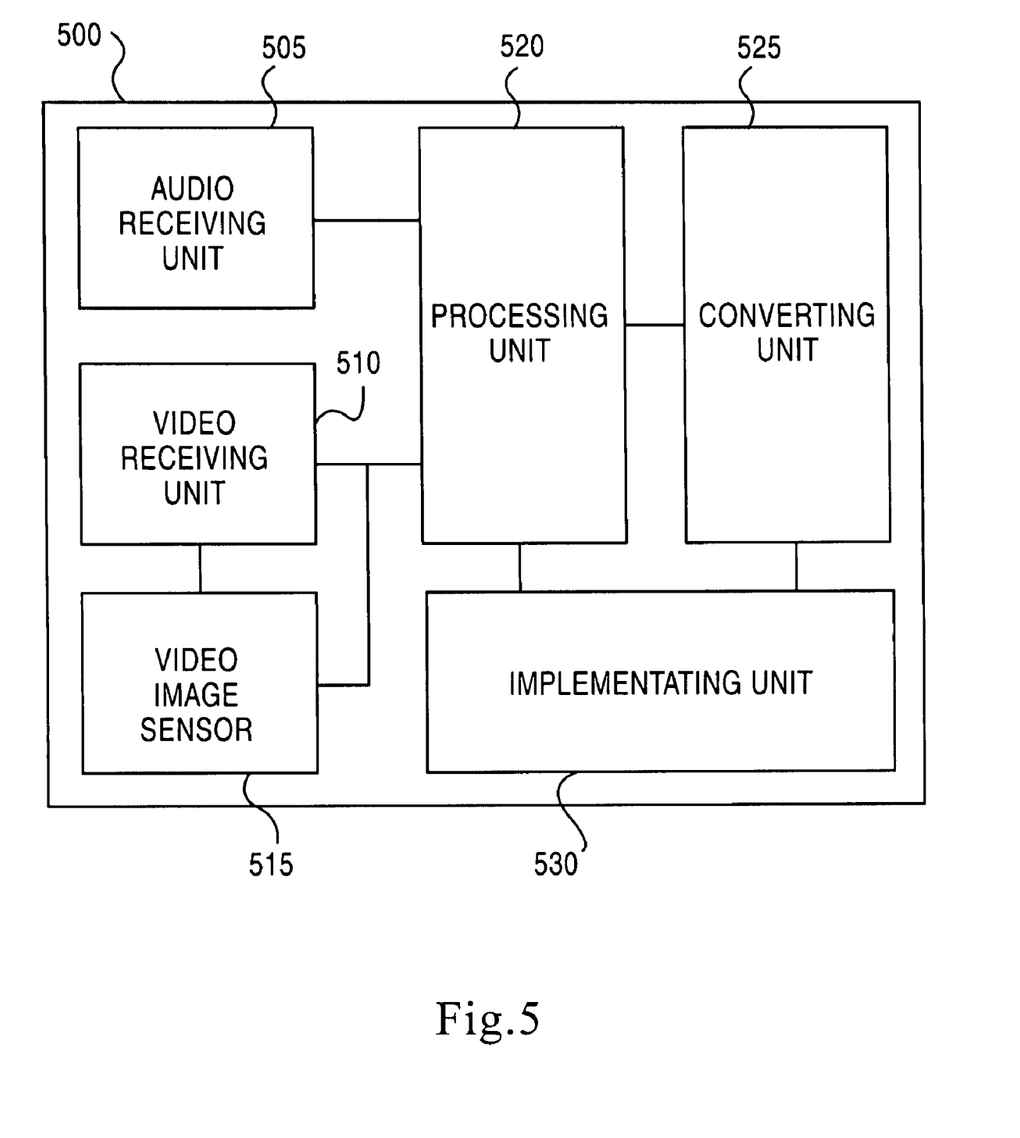
FIG. 5 illustrates one example of a hardware configuration for speech recognition using audio signals and correlating video signals, in accordance with the present invention.

FIG. 5 illustrates one example of a hardware configuration that can perform speech recognition based on audio input signals and correlating video input signals, in accordance with the present invention. In addition, the hardware configuration of FIG. 5 can be in an integrated, modular and single chip solution, and therefore can be embodied on a semiconductor substrate, such as silicon. Alternatively, the hardware configuration of FIG. 5 can be a plurality of discrete components on a circuit board. The configuration can also be implemented as a general purpose device configured to implement the invention with software.

FIG. 5 illustrates a device 500 configured to perform speech recognition based on audio signals and correlating video images of lip movements. Device 500 can contain an audio receiving unit 505 and a video receiving unit 510. The audio receiving unit 505 can receive audio input signals from one or more audio source(s) such as voice, speech, music, etc. The video receiving unit 510 can receive video input signals from one or more video source(s). For example, the video receiving unit 510 can receive video images of a speaker's lip movements. In addition, the device 500 can include a video image sensor 515, wherein the sensor 515 can detect when a particular image such as a speaker's lips is not being received by the video receiving unit 510. In other words, if the speaker's lips are not positioned in a way for the video receiving unit to receive video images of lips, then the sensor can detect missing video images and can alert the speaker.

Furthermore, the device 500 can include a processing unit 520 and a converting unit 525. The processing unit 520 can process the audio input signals as well as the video input signals. The converting unit 525 can convert the processed audio input signals and the video input signals into recognizable and comprehensible information. For instance, the converting unit 525 can convert the processed audio input signals and the video images of lip movements into executable commands or into text, etc. If the converted signals are commands to perform one or a set of function(s), then the implementation unit 530 can execute the command(s).

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A method of speech recognition, comprising:
   determining if video images of a speech source are detected;
   indicating if the video images are not detected;
   receiving audio signals from the speech source;
   receiving video signals from the speech source;
   detecting if the audio signals can be processed;
   processing the audio signals if it is detected that the audio signals can be processed;
   processing the video signals based on a detection that at least a portion of the audio signal cannot be processed;
   converting at least one of the audio signals and the video signals into recognizable information; and
   implementing a task based on the recognizable information.

2. The method of claim 1, wherein receiving the video signals comprises:
   receiving video images of lip movements that coincide with the audio signals.

3. The method of claim 1, wherein
   the audio signals and the video signals are processed in parallel, the video signals coinciding with the audio signals.

4. The method of claim 1, comprising:
   storing the audio signals and the video signals; and
   sending the audio signals and the video signals to a destination source.

5. The method of claim 1, wherein at least the receiving of the audio signals and the receiving of the video signals occurs in a mobile phone.

6. The method of claim 1, wherein at least the receiving of the audio signals and the receiving of the video signals occurs in a laptop computer, a home computer, a remote controller and/or a game console.

7. The method of claim 1, wherein the method occurs in a mobile phone.

8. The method of claim 7, wherein the mobile phone comprises a lens and a display.

9. The method of claim 7, wherein the method is part of a voice activated e-mail application.

10. The method of claim 7, wherein the recognizable information comprises one or more numeric characters.

11. The method of claim 7, wherein the recognizable information comprises code that is used to perform a particular function.

12. The method of claim 7, wherein the recognizable information comprises at least one of text and one or more executable commands.

13. The method of claim 1, wherein the method occurs a laptop computer, a home computer, a PDA, an audio/video recording device, a remote controller and/or a game console.

14. The method of claim 1, wherein the recognizable information comprises at least one of text and one or more executable commands.

15. A speech recognition device, comprising:
   an audio signal receiver configured to receive audio signals from a speech source;
   a video signal receiver configured to receive video signals from the speech source;
   a processing unit configured to detect if the audio signals can be processed and if so, to process the audio signals and process the video signals based on the detection that at least a portion of the audio signals cannot be processed;
   a conversion unit configured to convert at lease one of the audio signals and the video signals to recognizable information; and
   an implementation unit configured to implement a task based on the recognizable information,
   wherein the processing unit is configured to determine if the video image of a user is detected and, if the video image of the user is not detected, to indicate to the user that the video image is not detected.

16. The speech recognition device of claim 15, wherein the video signal receiver is configured to receive video images of lip movements that coincide with the audio signals.

17. The speech recognition device of claim 15, wherein the processing unit is configured to process the audio signals and the video signals in parallel, and wherein the video signals coincide with the audio signals.

18. The speech recognition device of claim 15, comprises:
a storage unit for storing the audio signals and the video signals; and
a transmitter for sending the audio signals and the video signals to a destination source.

19. The speech recognition device of claim 15, wherein the speech recognition device is part of a mobile phone.

20. The speech recognition device of claim 19, wherein the mobile phone comprises a lens and a display.

21. The speech recognition device of claim 19, wherein the speech recognition device is used with a voice activated e-mail application.

22. The speech recognition device of claim 19, wherein the recognizable information comprises one or more numeric characters.

23. The speech recognition device of claim 19, wherein the recognizable information comprises code that is used to perform a particular function.

24. The speech recognition device of claim 19, wherein at least the processing unit, the conversion unit and the implementation unit are integrated on a single chip.

25. The speech recognition device of claim 19, wherein the recognizable information comprises at least one of text and one or more executable commands.

26. The speech recognition device of claim 15, wherein the speech recognition device is part of a laptop computer, a home computer, a PDA, an audio/video recording device, a remote controller and/or a game console.

27. The speech recognition device of claim 15, wherein the recognizable information comprises at least one of text and one or more executable commands.

28. A system for speech recognition, comprising:
a first receiver that receives audio signals from a speech source;
a second receiver that receives video signals from the speech source;
a processor that detects if the audio signals can be processed and that processes the audio signals if the audio signals can be processed, the processor processing the video signals based on the detection that at least a portion of the audio signals can not be processed;
a converter that converts at least one of the audio signals and the video signals to recognizable information; and
an implementor that implements a task based on the recognizable information,
wherein the processor determines if the video image of a user is detected and, if the user's video image is not detected, indicates to the user that the video image is not detected.

29. The system of claim 28, wherein the second receiver receives video images of lip movements that coincide with the audio signals.

30. The system of claim 28, wherein the processor processes the audio signals and the video signals in parallel, and wherein the video signals coincide with the audio signals.

31. The system of claim 28, comprises:
a storage device that stores the audio signals and the video signals; and
a transmitter that transmits the audio signals and the video signals to a destination source.

32. The system of claim 28, wherein the system for speech recognition is part of a mobile phone.

33. The system of claim 32, wherein the mobile phone comprises a lens and a display.

34. The system of claim 32, wherein the system for speech recognition is used with a voice activated e-mail application.

35. The system of claim 32, wherein the recognizable information comprises one or more numeric characters.

36. The system of claim 32, wherein the recognizable information comprises code that is used to perform a particular function.

37. The system of claim 32, wherein at least the processor, the converter and the implementor are integrated on a single chip.

38. The system of claim 32, wherein the recognizable information comprises at least one of text and one or more executable commands.

39. The system of claim 28, wherein the system for speech recognition is part of a laptop computer, a home computer, a remote controller and/or a game console.

40. The system of claim 28, wherein the recognizable information comprises at least one of text and one or more executable commands.

* * * * *

UNITED STATES PATENT AND TRADEMARK OFFICE
CERTIFICATE OF CORRECTION

PATENT NO. : 7,587,318 B2  Page 1 of 1
APPLICATION NO. : 10/660780
DATED : September 8, 2009
INVENTOR(S) : Nambi Seshadri It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1318 days.

Signed and Sealed this

Twenty-first Day of September, 2010

David J. Kappos
*Director of the United States Patent and Trademark Office*